(12) United States Patent
Shin et al.

(10) Patent No.: US 8,958,855 B2
(45) Date of Patent: Feb. 17, 2015

(54) MOBILE TERMINAL HAVING SHIELDING MEMBER

(75) Inventors: Min-Chul Shin, Seoul (KR); Han-Seok Chae, Seoul (KR)

(73) Assignee: LG Electronics Inc., Seoul (KR)

( * ) Notice: Subject to any disclaimer, the term of this patent is extended or adjusted under 35 U.S.C. 154(b) by 896 days.

(21) Appl. No.: 12/567,990

(22) Filed: Sep. 28, 2009

(65) Prior Publication Data
US 2010/0105452 A1    Apr. 29, 2010

(30) Foreign Application Priority Data
Oct. 27, 2008   (KR) .......................... 10-2008-0105502

(51) Int. Cl.
*H04M 1/00* (2006.01)
*H04M 1/02* (2006.01)

(52) U.S. Cl.
CPC ........... *H04M 1/0277* (2013.01); *H04B 1/3838* (2013.01)
USPC ..................... 455/575.1; 455/575.7; 455/121; 455/128; 455/129

(58) Field of Classification Search
USPC .......... 455/63.4, 575.5, 575.7, 121, 128, 129, 455/269; 381/64
See application file for complete search history.

(56) References Cited

U.S. PATENT DOCUMENTS

| | | | | |
|---|---|---|---|---|
| 4,718,110 A | * | 1/1988 | Schaefer | 455/90.2 |
| 5,029,240 A | * | 7/1991 | de La Chapelle et al. | 398/202 |
| 5,456,779 A | * | 10/1995 | Sinha | 156/91 |
| 5,677,679 A | * | 10/1997 | Iwanishi | 340/815.69 |
| 5,917,710 A | * | 6/1999 | Maatta | 361/818 |
| 6,624,432 B1 | * | 9/2003 | Gabower et al. | 250/515.1 |
| 7,280,075 B2 | * | 10/2007 | Koyama et al. | 343/702 |
| 7,280,855 B2 | * | 10/2007 | Hawker et al. | 455/575.1 |
| 7,317,476 B2 | * | 1/2008 | Haruyama | 348/211.2 |
| 7,395,095 B2 | * | 7/2008 | Schrack | 455/569.1 |
| 7,629,930 B2 | * | 12/2009 | Murch et al. | 343/700 MS |
| 7,764,236 B2 | * | 7/2010 | Hill et al. | 343/702 |
| 2004/0106440 A1 | * | 6/2004 | Haruyama | 455/566 |
| 2008/0207283 A1 | * | 8/2008 | Zaitsu et al. | 455/575.3 |
| 2010/0105452 A1 | * | 4/2010 | Shin et al. | 455/575.8 |

FOREIGN PATENT DOCUMENTS

KR   10-2006-0092750 A   8/2006
KR   10-2008-0025257 A   3/2008

OTHER PUBLICATIONS

Korean Office Action issued in Application No. 10-2008-0105502 dated Sep. 28, 2014.

* cited by examiner

*Primary Examiner* — Temesgh Ghebretinsae
*Assistant Examiner* — Richard Chan
(74) *Attorney, Agent, or Firm* — KED & Associates LLP

(57) ABSTRACT

A mobile terminal is provided that includes front and rear cases, an intermediate case between the front and rear cases, and a printed circuit board between the intermediate cases and at least one of the front and rear cases. A shielding member having a first width, length and thickness, and being formed of a metal. Non-conductive material may have a second thickness attached to at least two edges of the shielding member.

18 Claims, 9 Drawing Sheets

MOBILE TERMINAL HAVING SHIELDING MEMBER

This application claims priority from Korean Application No. 10-2008-0105502, filed Oct. 27, 2008, the subject matter of which is incorporated herein by reference.

BACKGROUND

1. Field

Embodiments of the present invention may relate to a mobile terminal having a shielding member for blocking electromagnetic waves.

2. Background

Mobile terminals may be easily carried and may have functions such as supporting voice and video telephony calls, inputting and/or outputting information, storing data and the like.

As terminals become multifunctional, the mobile terminal may capture still images or moving images, play music or video files, play games, receive broadcast and the like, and may be implemented as an integrated multimedia player.

Hardware or software may implement the functions of the multimedia devices. For example, a user interface environment may be provided in order for users to easily and conveniently retrieve or select functions.

A mobile terminal is provided with many electronic components to perform such various functions. Electromagnetic waves generated inside or outside the mobile terminal may have a bad influence on the electronic components, such as signal distortion. Research may have being conducted for technology relating to shielding the electronic components from electromagnetic waves. One example of such technology may be a shield that can cover a shielding region of a printed circuit board.

BRIEF DESCRIPTION OF THE DRAWINGS

Arrangements and embodiments may be described in detail with reference to the following drawings in which like reference numerals refer to like elements and wherein.

DETAILED DESCRIPTION

A description may now be provided in detail of configurations and embodiments of mobile terminals. Suffixes "module" and "unit" or "portion" for components as used herein are merely provided only for facilitation of preparing this specification, and thus are not granted a specific meaning or function. "Module" and "unit" or "portion" may be used together.

Figure 1:
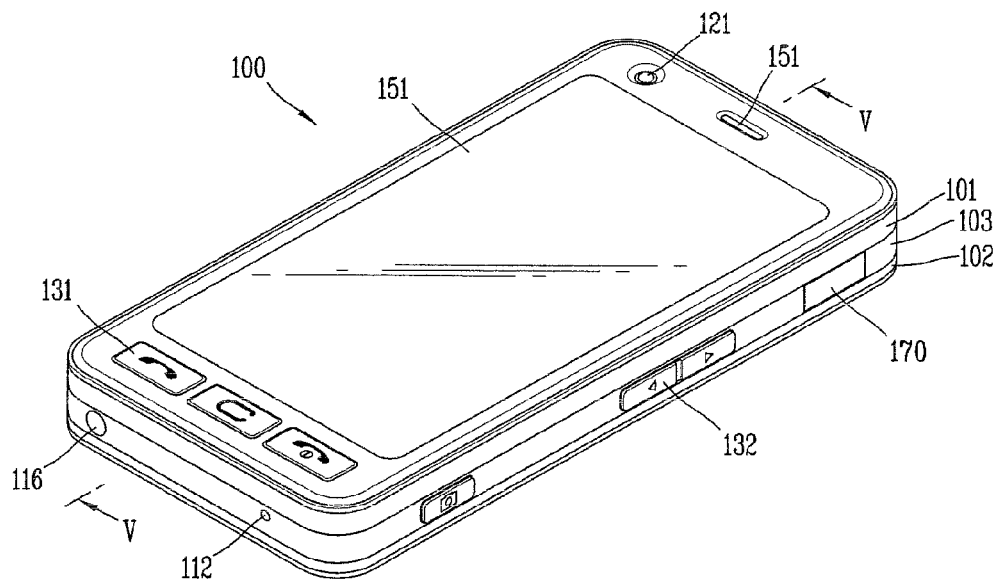
FIG. 1 is a front perspective view of a mobile terminal in accordance with one example embodiment.

FIG. 1 is a front perspective view of a mobile terminal in accordance with one example embodiment. Other embodiments and arrangements may also be provided.

A mobile terminal 100 may have two bar type terminal bodies; however, embodiments are not limited to this configuration as they may be applicable to various configurations, such as a bar type, a folder type, a swing type, a swivel type and the like, such that two or more bodies are coupled to move relative to each other.

The terminal body may include a case (e.g., casing, housing, cover, etc.) that forms an outer appearance. The case may be divided into a front case 101, a rear case 102 and an intermediate case 103. Various electric components may be provided in a space between the front case 101 and the intermediate case 103 and in a space between the intermediate case 103 and the rear case 102. Alternatively, the case may be configured only from the front case 101 and the rear case 102.

The cases may be formed by injection-molded synthetic resin, or may be formed using a metallic material such as stainless steel (STS) or titanium (Ti).

The terminal body and more specifically the front case 101 is shown as having a display 151, an audio output module 152, a camera 121, a user input unit 130 (e.g., first and second manipulation units 131 and 132), a microphone 122, an interface unit 170 and the like.

The display 151 may occupy most of a main surface of the front case 101. The audio output module 152 and the camera 121 may be provided at a region adjacent to one of both end portions of the display 151, and the first manipulation unit 131 and the microphone 122 may be provided at a region adjacent to another end portion of the display 151.

The user input unit 130 may be manipulated to allow inputting of commands for controlling operations of the mobile terminal 100. The user input unit 130 may include the first and second manipulation units 131 and 132. The first and second manipulation units 131 and 132 may be referred to as a manipulating portion. The manipulating portion may employ any tactile manner that a user can touch or tap for manipulation. The first manipulation unit 131 may be provided at the front case 101 and the second manipulation unit 132 may be provided at the intermediate case 102.

Contents input by the first and second manipulation units 131 and 132 may be set differently. For example, the first manipulation unit 131 may be configured to input commands such as START, END, SCROLL and/or the like, and the second manipulation unit 132 may be configured to input commands, such as adjusting audio volume output from the audio output module 152, converting the display 151 into a touch recognition mode, and/or the like.

The interface unit 170 may be provided on (or at) the intermediate case 103. The interface unit 170 may interface the mobile terminal 100 with external devices so as to allow a data exchange therebetween. For example, the interface unit 170 may be one of a wireless/wired earphone connection port, a port for short-range communication (e.g., infrared Data Association (IrDA) port, Bluetooth Port, wireless Lan port, etc.), power supply ports for providing power to the mobile terminal, and/or the like.

Figure 2:
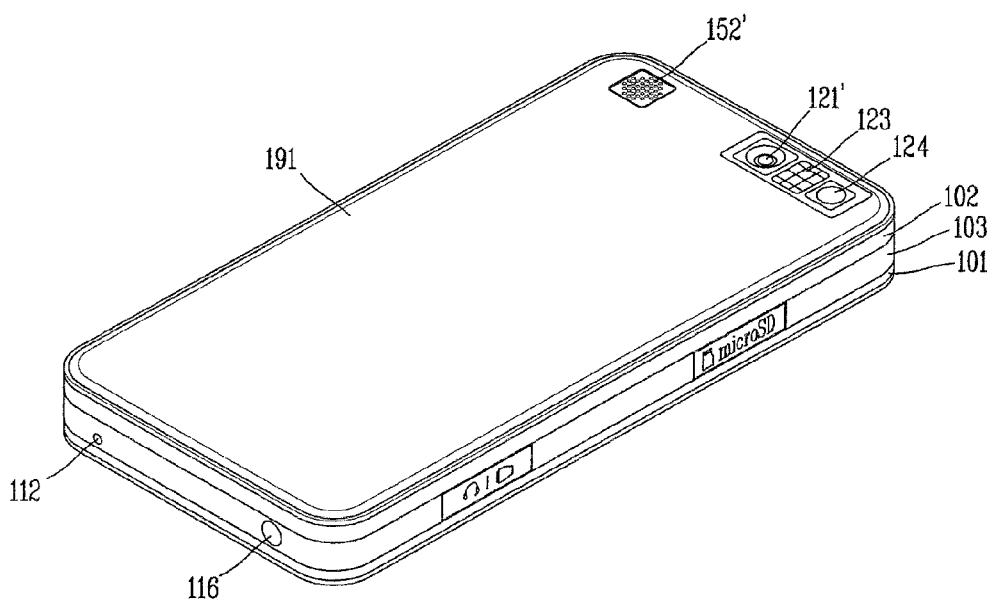
FIG. 2 is a rear perspective view of a mobile terminal in accordance with one example embodiment.

FIG. 2 is rear perspective view of a mobile terminal in accordance with one example embodiment.

As shown in FIG. 2, a rear face of the terminal body and more specifically the rear case 102 may be provided with another camera 121'. The camera 121' may face a direction that is opposite to a direction faced by the camera 121, and the camera 121 may have different pixels from those of the camera 121.

For example, the camera 121 may operate with relatively lower pixels (i.e., a lower resolution). Thus, the camera 121 may be useful when a user can capture his face and send it to another party during a video call or the like. On the other hand, the camera 121' may operate with a relatively higher pixels (i.e., higher resolution) such that a user may obtain higher quality pictures for later use. The cameras 121 and 121' may be installed on or in the terminal body to be rotatable or popped up.

A flash 123 and a mirror 124 may be additionally provided adjacent to the camera 121'. The flash 123 may operate in conjunction with the camera 121' when taking a picture using the second camera 121'. The mirror 124 may cooperate with the camera 121' to allow a user to photograph himself in a self-portrait mode.

Another audio output module 152' may be further provided at a rear face of the terminal body. The audio output module 152' may cooperate with the audio output module 152 to provide a stereo output. The audio output module 152' may also operate as a speakerphone.

A broadcast signal receiving antenna 116 may be further provided at a side surface of the terminal body in addition to an antenna for communications. The antenna 116 may be configured as a part of a broadcast receiving module and may be retractable into the terminal body.

A power supply 190 (not shown in FIGS. 1-2) for supplying power to the mobile terminal 100 may be provided in the terminal body. The power supply 190 may be mounted inside the terminal body or may be detachably coupled directly to the outside of the terminal body. A battery cover 191 for covering the power supply may be detachably coupled to the terminal body.

Figure 3:
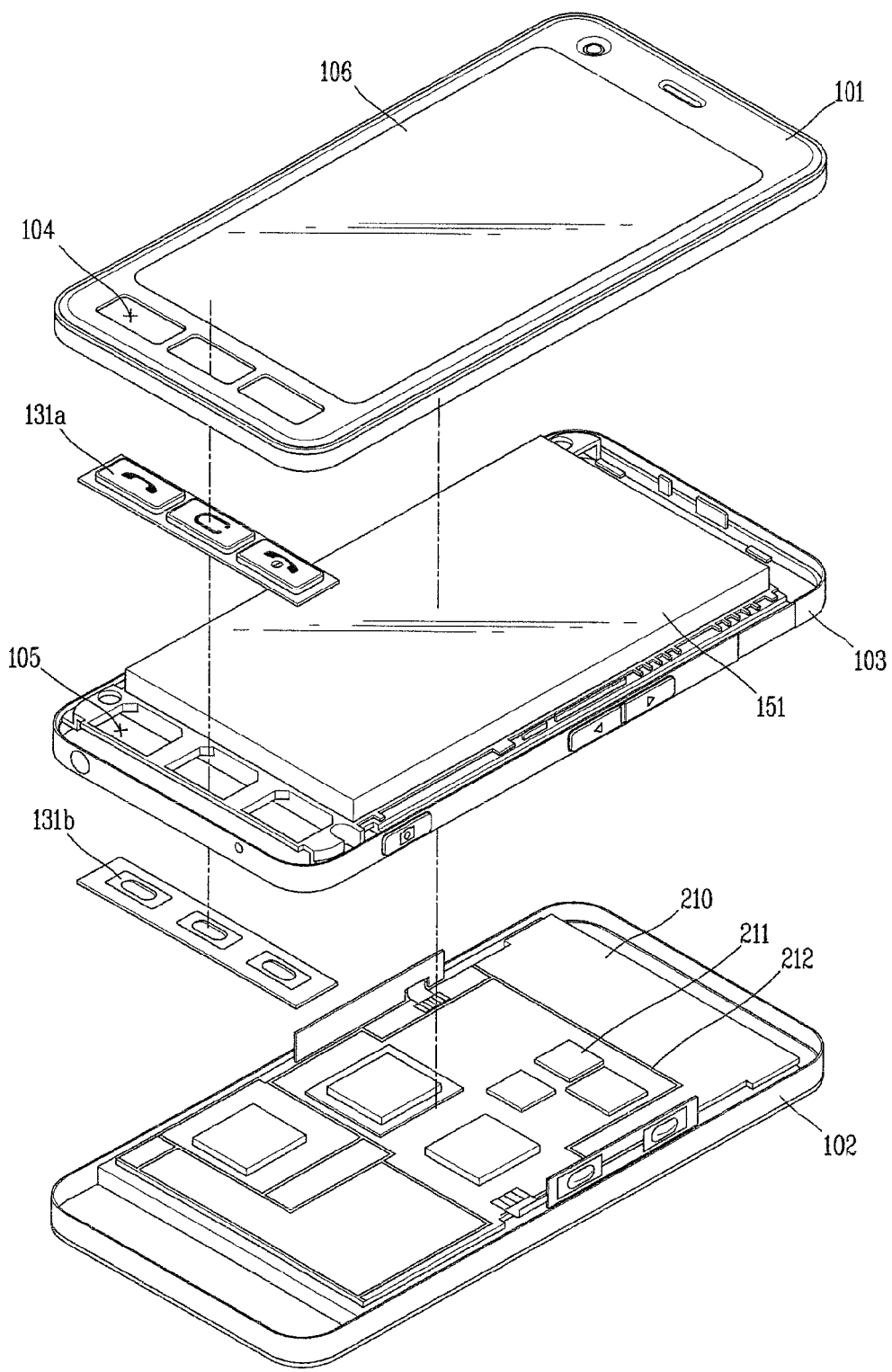
FIG. 3 is a disassembled view of a mobile terminal in accordance with one example embodiment of the present invention.

FIG. 3 is a disassembled view of the mobile terminal 100 in accordance with one example embodiment of the present invention. Other embodiments and configurations are also within the scope of the present invention.

As shown in FIG. 3, the display 151 may be provided in a space formed between the front case 101 and the intermediate case 103. A printed circuit board 210 may be mounted in a space formed between the intermediate case 103 and the rear case 102.

A button hole 104 in which the first manipulation unit 131 is aligned may be formed on the front case 101. The first manipulation unit 131 may include a key button 131a disposed in the button hole 104 to be pressed, and a switch 131b for inputting information in cooperation with the pressed key button 131a. The intermediate case 103 may be provided with a button hole 105, and the switch 131b may be mounted on a rear surface of the intermediate case 103.

A plurality of electric devices 211 may be mounted on one surface of the printed circuit board 210 and more specifically on a surface facing the intermediate case 103.

The printed circuit board 210 may be provided with a metallic pattern 212 that partitions spaces between the electric devices 211 so as to configure a plurality of regions. The metallic pattern 212 may be formed of copper and may be electrically connected to a ground of the printed circuit board 210.

Figure 4:
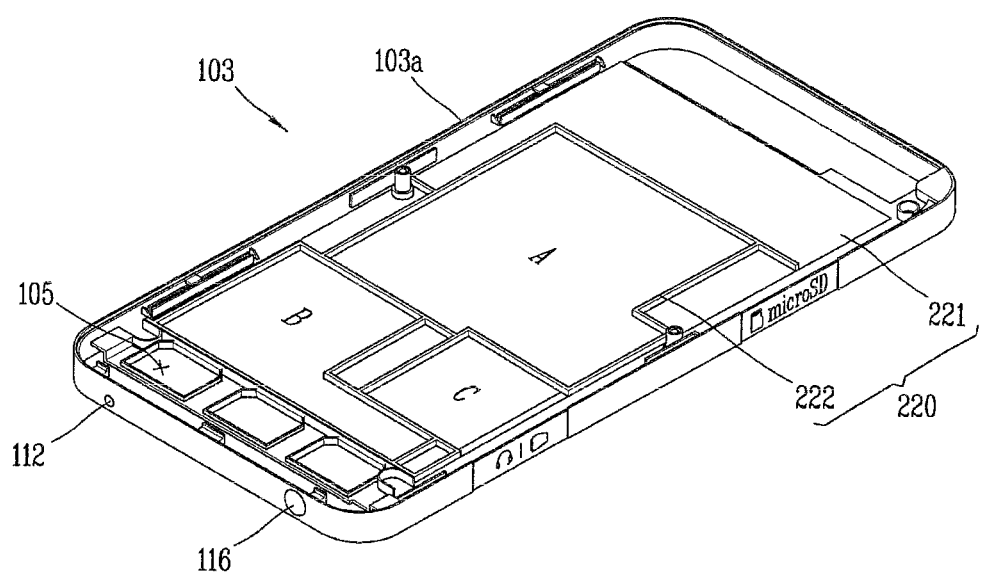
FIG. 4 is a perspective view of an intermediate case (of FIG. 3) shown from a rear surface.
Figure 5:
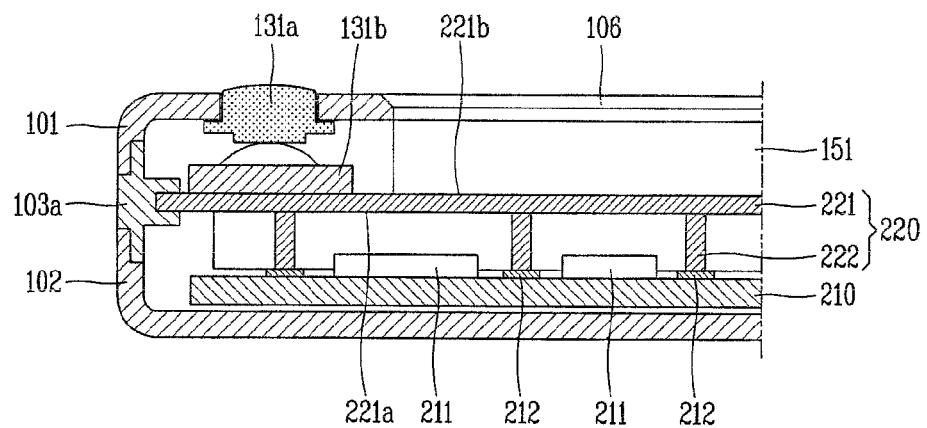
FIG. 5 is a cross-sectional view of the mobile terminal taken along line V-V (FIG. 1)

FIG. 4 is a perspective view of the intermediate case (of FIG. 3) shown from a rear surface. FIG. 5 is a cross-sectional view of the mobile terminal taken along line V-V of FIG. 1.

As shown in FIG. 4, a shielding member 220 for electrically shielding the electric devices 211 on the printed circuit board 210 may be provided in or on the intermediate case 103. The printed circuit board 210 may be shielded by the shielding member 220 positioned between the intermediate case 103 and the rear case 102. Alternatively, the printed circuit board 210 may be positioned between the front case 101 and the intermediate case 103.

The shielding member 220 may be configured as part of the intermediate case 103, and may be made or formed of a metal (e.g. stainless steel (STS)). The shielding member 220 may include shielding regions (e.g. A, B and C regions) between the intermediate case 103 and the printed circuit board 210. The shielding member 220 may have a first prescribed width, length and thickness.

When the intermediate case 103 is made of a synthetic resin, the intermediate case 103 may be formed together with the shielding member 220 by an insertion injection molding. According to the fabrication method, the shielding member 220 may be inserted into or onto the intermediate case 103 so as to be integrally formed with the intermediate case 103.

The intermediate case 103 may include the shielding member 220 formed of a metal, and an exterior member 103a formed of a non-conductive material that encloses a periphery of the shielding member 220. The exterior member 103a or the non-conductive material may have a second thickness attached to at least two edges of the shielding member 220. The second thickness of the non-conductive material may be greater than the first thickness of the shielding member 220. The non-conductive material may form an exterior of the mobile terminal 100 and may serve as an intermediate case.

The shielding member 220 may include a base 221 and a plurality of metallic ribs 222 (or extending portion) that extend in a direction from the base 221 toward the printed circuit board 210.

The base 221 may be formed of a metal and may be formed in a plate shape. The base 221 may be configured to one surface of the intermediate case 103. The base 221 may be configured to front and rear cases of the intermediate case 103.

The exterior member 103a (or the non-conductive material) may be integrally formed with the base 221. An outer surface of the exterior member 103a may be exposed to the exterior so as to configure one surface (i.e., a side surface) of the terminal body. The exterior member 103a (or the non-conductive material) may be coupled to the front case 101 and the rear case 103, respectively.

As shown in FIG. 5, the base 221 may include a first surface 221a facing the printed circuit board 210 and a second surface 221b that in a faces direction away from the printed circuit board 210 (i.e., in a direction opposite from the first surface 221a). The first surface 221a may correspond to a rear surface of the intermediate case 103 and the second surface 221b may correspond to a front surface of the intermediate case 103.

The exterior member 103a (or the non-conductive material) may cover at least one region of each of the first surface 221a and the second surface 221b. That is, the exterior member 103a may cover a region corresponding to an edge of the base 221.

The metallic ribs 222 may be formed of a conductive material, such as a metal, in a similar manner as the base 221. The metallic ribs 222 may extend from the first surface 221a and toward the printed circuit board 210 and may come into contact with the metallic pattern 212 of the printed circuit board 210. The metallic ribs 222 may have a height greater than a height of at least one of the electric devices 211.

The metallic ribs 222 may be formed along peripheries of the shielding regions (e.g. the A, B and C regions). The metallic ribs 222 may be configured as a plurality of extending portions so as to partition the shielding regions. The metallic ribs 222 may have a pattern that corresponds to the metallic pattern 212 such that the metallic ribs 222 come in contact with the metallic pattern 212.

The metallic ribs 222, as a separate member from the base 221, may be attached to the base 221. Alternatively, the metallic ribs 222 may be integrally formed with the base 221. The metallic ribs 222, as a separate member, may be attached to the base 221.

The display 151 may be mounted on the second surface 221b of the base 221. A window 106 formed of a transparent material may be provided on the front case 101.

Figure 6A:
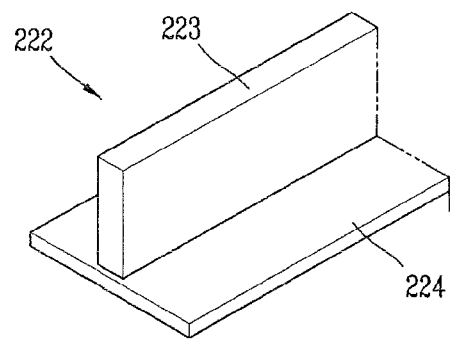
FIGS. 6A and 6B are views each showing an exemplary configuration of an extension portion.

FIG. 6A is a perspective view showing an exemplary configuration of a rib (an extending portion). As shown in FIG. 6A, the metallic ribs 222 may include a contact portion 223 formed in a shape of rib, and a welded portion 224 to weld onto the base 221 (or attach in some other way).

The welded portion 224 may have a large enough predetermined area to be welded on the base 221. The contact portion 223 may extend from the welded portion 224 and have a contact surface that contacts the metallic pattern 212 of the printed circuit board 210.

Figure 6B:
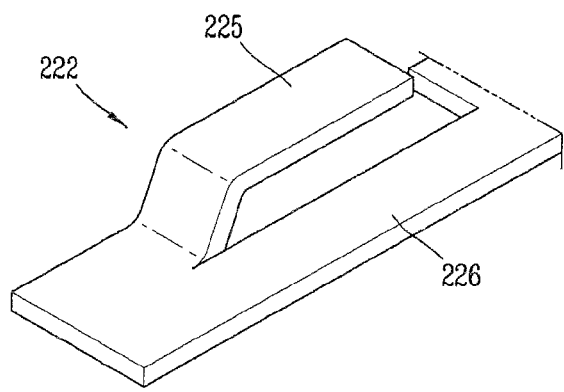

FIG. 6B is a perspective view showing another exemplary configuration of an extending portion.

As shown in FIG. 6B, the metallic ribs 222 may include a contact portion 225 and a welded portion 226. The contact portion 225 may be formed by cutting one region of the welded portion 226. The contact portion 225 may be curved so as to have a contact surface with the metallic pattern 211 of the printed circuit board 210. The contact portion 225 may be configured as a plurality of contact portions 225 along a lengthwise direction of the welded portion 226.

A conductive elastic member (e.g. conductive rubber) may be further attached to each of the contact portions 223 and 225 shown in FIGS. 6A and 6B for flexible contact with the metallic pattern 212.

An operation state of the mobile terminal may now be described with reference to FIGS. 4 and 5.

The shielding member 220 may come in contact with the metallic pattern 212 of the printed circuit board 210 and the shielding member 220 may thus define the shielding regions (i.e., the A, B and C regions of FIG. 4) between the intermediate case 103 and the printed circuit board 210.

The shielding member 220 may protect the electric devices 211 from electromagnetic waves generated outside the terminal body by defining each shielding region. The shielding member 220 may also prevent an interference from occurring between the electric devices 211 mounted in each region of the printed circuit board 210.

The electromagnetic waves generated outside the terminal body may not infiltrate into the shielding member 220 due to the electromagnetic waves being adsorbed by the base 221. Electromagnetic waves generated from the electric device 211 mounted in a particular shielding region (e.g. the region A) may be adsorbed by the base 221 and the metallic ribs 222. Accordingly, the electromagnetic waves generated in the region A may not infiltrate into the regions B or C. The electromagnetic waves adsorbed by the shielding member 220 may be in a form of a current that flows to the metallic pattern 212, thereby being dissipated to the ground.

The shielding member 220 may be integrally formed with the case, which allows further slimming of a thickness of a terminal body, and may also enable simplification of an assembly process as compared to a shield mounted on a printed circuit board. If the case is formed of a synthetic resin, the metallic shielding member 220 may be configured to be part of the case, thereby improving rigidity of the case.

Figure 7A:
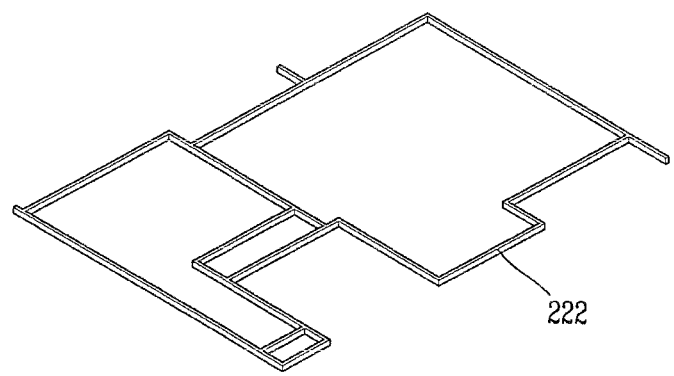
FIGS. 7A to 7C are views showing a process of fabricating the intermediate case of FIG. 4.
Figure 7B:
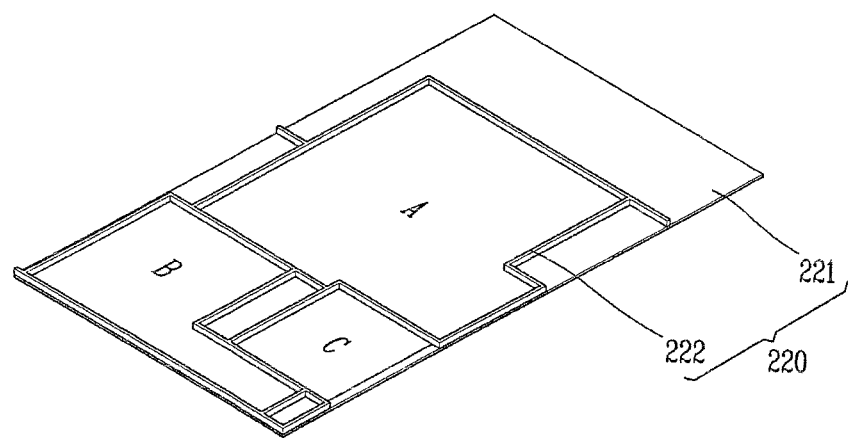
Figure 7C:
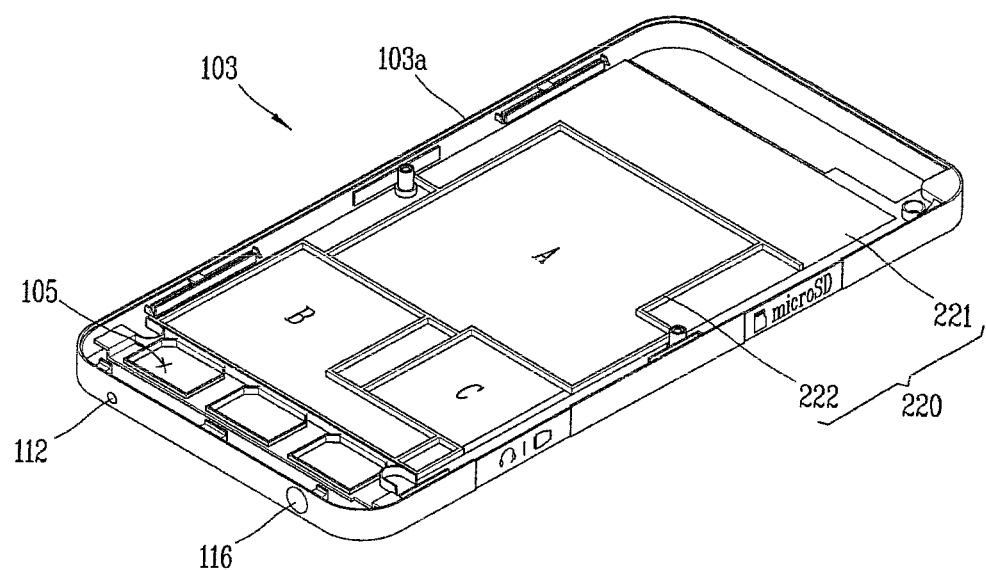

FIGS. 7A to 7C are views showing a fabricating process of the intermediate case 103.

The metallic ribs 222 may be prepared as shown in FIG. 7A. The metallic ribs 222 may be fabricated in various forms depending on an arrangement of the electric devices 211 mounted on the printed circuit board 210 and a form of the metallic pattern 212.

One region of a metallic member in a shape of a rod may be cut to be curved, so as to implement the contact portion 225 and the welded portion 226 as shown in FIG. 6B.

As shown in FIG. 7B, the metallic ribs 222 may be attached to the base 221. The metallic ribs 222 may be attached to the base 221 by a laser welding, for example. Accordingly, the shielding member 220 may be configured.

Alternatively, the base 221 and the metallic ribs 222 may be integrally formed.

As shown in FIG. 7C, the intermediate case 103 (i.e., the exterior member 103a or the non-conductive member) may be formed at a periphery of the shielding member 220, such as being attached to at least two edges of the shielding member 220. The exterior member 103a and the shielding member 220 may be integrally formed by an insertion injection molding. That is, the shielding member 220 completed in the process of FIG. 7B and a synthetic resin may be molded together by means of a same mold, thereby injecting the intermediate case 103.

Figure 8:
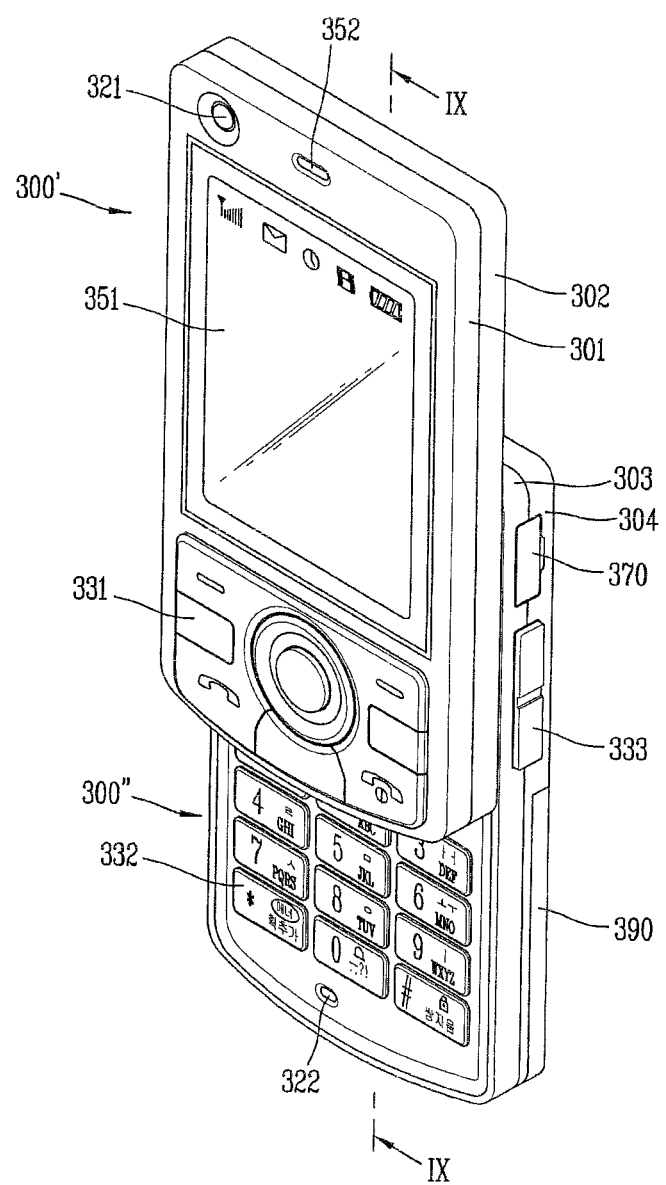
FIG. 8 is a perspective view of a mobile terminal in accordance with an example embodiment of the present invention.

FIG. 8 is a perspective view of a mobile terminal in accordance with an example embodiment of the present invention. This embodiment relates to a slide type mobile terminal.

As shown in FIG. 8, a mobile terminal 300 may include a first body 300' and a second body 300" that slides with respect to the first body 300' in at least one direction.

The first body 300' may be positioned over the second body 300", which is referred to as a closed position (i.e., a closed state or a closed configuration). As shown in FIG. 8, the first body 300' may expose at least part of the second body 300", which is referred to as an open position (i.e., an open state or an open configuration).

The mobile terminal 300 may operate in a standby mode in the closed configuration and the standby mode may be released according to a user's manipulation. The mobile terminal 300 may also operate in a call-communication mode in the open configuration and the mode may be converted into the standby mode according to the user's manipulation or after a preset time duration.

The first body 300' may be provided with a display 351, an audio output module 352, a camera 321, a first manipulation unit 331 and the like, and the second body 300" may be provided with second and third manipulation units 332 and 333, an audio input unit 322, an interface unit 370, a power supply 390 and the like.

The first body 300' may be formed from a front case 301 and a rear case 302. The second body 300" may be formed from a front case 303 and a rear case 304.

Figure 9:
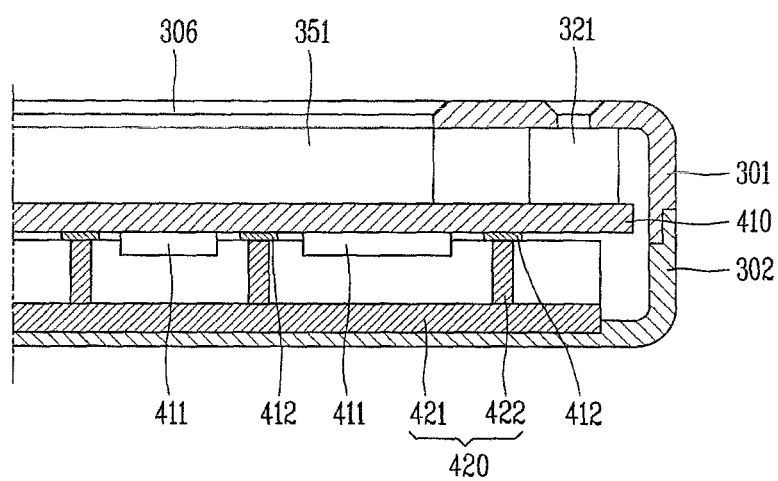
FIG. 9 is a cross-sectional view of the mobile terminal taken along line IX-IX (FIG. 8)

FIG. 9 is a cross-sectional view of the mobile terminal taken along line IX-IX of FIG. 8.

As shown in FIG. 9, a printed circuit board 410 may be provided in a space between the front case 301 and the rear case 302.

The display 351 may be mounted on a front surface of the printed circuit board 410, and electric devices 411 may be mounted on a rear surface thereof. The printed circuit board 410 may be provided with a metallic pattern 412 for partitioning shielding regions.

The shielding member 420 may configure a part of the rear case 302. That is, the rear case 302 and the shielding member 420 may be integrally formed by an insertion injection molding.

The shielding member 420 may include a base 421 and a plurality of metallic ribs 422 (or extending portions). The metallic ribs 422 may extend from a first surface 421a of the base 421 so as to come in contact with the metallic pattern 412.

The rear case 302 may cover a second surface 421b of the base 421 to prevent the base 421 from being externally exposed. That is, if a case is formed from the front case 301 and the rear case 302, the case may be injected to cover a second surface 421b of the base 421.

Figure 10:
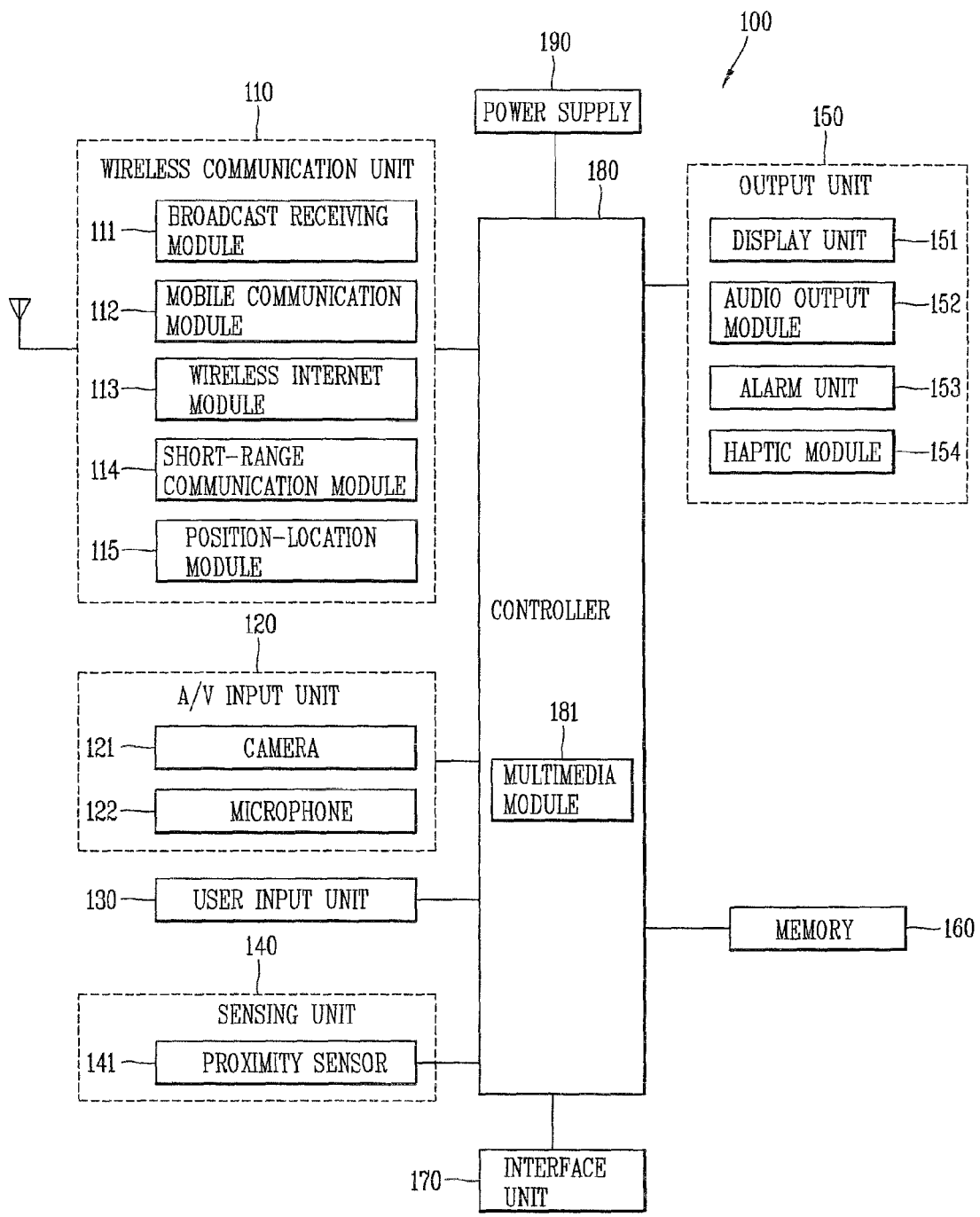
FIG. 10 is a block diagram of a mobile terminal in accordance with one example embodiment.

FIG. 10 is a block diagram of a mobile terminal in accordance with an example embodiment.

The mobile terminal 100 may include components, such as a wireless communication unit 110, an Audio/Video (A/V) input unit 120, a user input unit 130, a sensing unit 140, an output unit 150, a memory 160, an interface unit 170, a controller 180, a power supply 190 and the like. FIG. 10 shows the mobile terminal 100 having various components, although other components may also be used. More or less components may alternatively be implemented.

The wireless communication unit 110 may include one or more modules that permit wireless communications between the mobile terminal 100 and a wireless communication system or between the mobile terminal 100 and a network within which the mobile terminal 100 is located. For example, the wireless communication unit 110 may include a broadcast receiving module 111, a mobile communication module 112, a wireless Internet module 113, a short-range communication module 114, a position-location module 115 (or position-location module) and the like.

The broadcast receiving module 111 may receive a broadcast signal and/or broadcast associated information from an external broadcast managing entity (or server) via a broadcast channel.

The broadcast channel may include a satellite channel and a terrestrial channel. The broadcast managing entity may indicate a server that generates and transmits a broadcast signal and/or broadcast associated information or a server that receives a pre-generated broadcast signal and/or broadcast associated information and sends the signals to the mobile terminal. The broadcast signal may be a TV broadcast signal, a radio broadcast signal, and/or a data broadcast signal, for example. The broadcast signal may further include a data broadcast signal combined with a TV or radio broadcast signal.

Examples of broadcast associated information may include information associated with a broadcast channel, a broadcast program, a broadcast service provider, and/or the like. The broadcast associated information may be provided via a mobile communication network, and may be received by the mobile communication module 112.

The broadcast associated information may be implemented in various formats. For example, broadcast associated information may include an Electronic Program Guide (EPG) of Digital Multimedia Broadcasting (DMB), an Electronic Service Guide (ESG) of Digital Video Broadcast-Handheld (DVB-H), and/or the like.

The broadcast receiving module 111 may receive digital broadcast signals transmitted from various types of broadcast systems. Such broadcast systems may include Digital Multimedia Broadcasting-Terrestrial (DMB-T), Digital Multimedia Broadcasting-Satellite (DMB-S), Media Forward Link Only (MediaFLO), Digital Video Broadcast-Handheld (DVB-H), Integrated Services Digital Broadcast-Terrestrial (ISDB-T) and/or the like. The broadcast receiving module 111 may be suitable for every broadcast system transmitting broadcast signals as well as the digital broadcasting systems.

The broadcast signals and/or the broadcast associated information received via the broadcast receiving module 111 may be stored in a suitable device, such as the memory 160.

The mobile communication module 112 may transmit/receive wireless signals to/from at least one or more network entities (e.g., a base station, an external mobile terminal, a server, etc.) on a mobile communication network. The wireless signals may include an audio call signal, a video (telephony) call signal, and/or various formats of data according to transmission/reception of text/multimedia messages.

The wireless Internet module 113 may support wireless Internet access for the mobile terminal. The wireless Internet module 113 may be internally or externally coupled to the mobile terminal 100. Examples of such wireless Internet access may include Wireless LAN (WLAN) (Wi-Fi), Wireless Broadband (Wibro), Worldwide Interoperability for Microwave Access (Wimax), High Speed Downlink Packet Access (HSDPA) and/or the like.

The short-range communication module 114 may be a module for short-range communications. Suitable technologies for implementing the short-range communication module 114 may include BLUETOOTH, Radio Frequency IDentification (RFID), Infrared Data Association (IrDA), Ultra-WideBand (UWB), ZigBee, and/or the like.

The position-location module 115 may detect or calculate a position of the mobile terminal 100. An example of the position-location module 115 may include a Global Position System (GPS) module.

The A/V input unit 120 may provide audio or video signal input to the mobile terminal 100. The A/V input unit 120 may include the camera 121 and a microphone 122. The camera 121 may receive and process image frames of still pictures or video obtained by image sensors in a video call mode or a capturing mode. The processed image frames may be displayed on the display 151.

The image frames processed by the camera 121 may be stored in the memory 160 or may be transmitted to the exterior via the wireless communication unit 110. Two or more cameras 121 may also be provided on the mobile terminal.

The microphone 122 may receive an external audio signal while the mobile terminal is in a particular mode, such as a phone call mode, a recording mode, a voice recognition mode, and/or the like. The audio signal may be processed into digital data. The processed digital data may be converted for output into a format transmittable to a mobile communication base station via the mobile communication module 112 in case of the phone call mode. The microphone 122 may include noise removing algorithms (or noise canceling algorithms) to remove or reduce noise generated in the course of receiving the external audio signal.

The user input unit 130 may generate input data inputted by a user to control operation of the mobile terminal 100. The user input unit 130 may include a keypad, a dome switch, a touchpad (e.g., static pressure/capacitance), a jog wheel, a jog switch and/or the like.

The sensing unit 140 may provide status measurements of various aspects of the mobile terminal 100. For example, the sensing unit 140 may detect an open/close status (or state) of the mobile terminal 100, a change in a location of the mobile terminal 100, a presence or absence of user contact with the mobile terminal 100, a location of the mobile terminal 100, acceleration/deceleration of the mobile terminal 100, and/or the like, so as to generate a sensing signal for controlling operation of the mobile terminal 100. For example, for a slide-type mobile terminal, the sensing unit 140 may sense whether a sliding portion of the mobile terminal 100 is open or closed. Other examples include sensing functions, such as the sensing unit 140 sensing a presence or absence of power provided by the power supply 190, a presence or absence of a coupling or other connection between the interface unit 170 and an external device. The sensing unit 140 may also include a proximity sensor 141.

The output unit 150 may output an audio signal, a video signal and/or a tactile signal. The output unit 150 may include the display 151, an audio output module 152, an alarm 153, a haptic module 154, and/or the like.

The display 151 may output information processed in the mobile terminal 100. For example, when the mobile terminal 100 is operating in a phone call mode, the display 151 may provide a User Interface (UI) or a Graphic User Interface (GUI) that includes information associated with the call. If the mobile terminal 100 is in a video call mode or a capturing mode, the display 151 may additionally or alternatively display images captured and/or received, a UI, or a GUI.

The display 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, and/or the like.

The displays 151 may be implemented as a transparent type or an optical transparent type through which the exterior is visible, which is referred to as a transparent display. A representative example of the transparent display may include a Transparent OLED (TOLED), and/or the like. The rear surface of the display 151 may also be optically transparent. In this configuration, a user can view an object positioned at a rear side of a terminal body through a region occupied by the display 151 of the terminal body.

The display 151 may include two or more displays according to a configured aspect of the mobile terminal 100. For example, a plurality of the displays 151 may be arranged on one surface and may be spaced from or integrated with each other, or may be arranged on different surfaces.

If the display 151 and a touch sensitive sensor (referred to as a touch sensor) may have a layered structure therebetween, the structure may be referred to as a touch screen. The display 151 may be an input device rather than an output device. The touch sensor may be implemented as a touch film, a touch sheet, a touch pad, and/or the like.

The touch sensor may convert changes of a pressure applied to a specific part of the display 151, or a capacitance occurring from a specific part of the display 151, into electric input signals. The touch sensor may sense not only a touched position and a touched area, but also a touch pressure.

When touch inputs are sensed by the touch sensors, corresponding signals may be transmitted to a touch controller (not shown). The touch controller may process the received signals, and then transmit corresponding data to the controller 180. Accordingly, the controller 180 may sense which region of the display 151 has been touched.

The proximity sensor 141 may be arranged at an inner region of the mobile terminal 100 covered by the touch screen or near the touch screen. The proximity sensor 141 may sense a presence or absence of an object approaching a surface to be sensed, or an object provided near a surface to be sensed, by using an electromagnetic field or infrared rays without a mechanical contact. The proximity sensor 141 may have a longer lifespan and a more enhanced utility than a contact sensor.

The audio output module 152 may output audio data received from the wireless communication unit 110 or stored in the memory 160, in a call-receiving mode, a call-placing mode, a recording mode, a voice recognition mode, a broadcast reception mode, and so on. The audio output module 152 may output audio signals relating to functions performed in the mobile terminal 100, e.g., sound alarming a call received or a message received, and so on. The audio output module 152 may include a receiver, a speaker, a buzzer, and so on.

The alarm 153 may output signals notifying occurrence of events from the mobile terminal 100. The events may include a call received, a message received, a key signal input, a touch input, and/or etc. The alarm 153 may output not only video or audio signals, but also other types of signals such as signals notifying occurrence of events in a vibration manner. Since the video or audio signals can be output through the display 151 or the audio output unit 152, the display 151 and the audio output module 152 may be categorized as a part of the alarm 153.

The haptic module 154 may generate various tactile effects that a user can feel. A representative example of the tactile effects generated by the haptic module 154 may include vibration. Vibration generated by the haptic module 154 may have a controllable intensity, a controllable pattern, and/or etc. For example, different vibrations may be output in a synthesized manner or in a sequential manner.

The haptic module 154 may generate various tactile effects, including not only vibration, but also an arrangement of pins vertically moving with respect to a skin being touched (contacted), an air injection force or an air suction force through an injection hole or a suction hole, touch by a skin surface, a presence or absence of contact with an electrode, effects by stimulus such as an electrostatic force, reproduction of a cold or hot feeling using a heat absorbing device or a heat emitting device, and/or the like.

The haptic module 154 may transmit tactile effects (signals) through a user's direct contact, and/or a user's muscular sense using a finger or a hand. The haptic module 154 may be implemented in two or more modules/units according to configuration of the mobile terminal 100.

The memory 160 may store a program for processing and control of the controller 180. The memory 160 may temporarily store input/output data (e.g., phonebook data, messages, still images, video and the like). The memory 160 may also store data related to various patterns of vibrations and audio output upon the touch input on the touch screen.

The memory 160 may be implemented using any type of suitable storage medium including a flash memory type, a hard disk type, a multimedia card imcro type, a memory card type (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and/or the like. The mobile terminal 100 may operate a web storage that performs the storage function of the memory 160 on the Internet.

The interface unit 170 may interface the mobile terminal 100 with external devices. The interface unit 170 may allow a data reception from an external device, a power delivery to each component in the mobile terminal 100, or a data transmission from the mobile terminal 100 to an external device. The interface unit 170 may include wired/wireless headset ports, external charger ports, wired/wireless data ports, memory card ports, ports for coupling devices having an identification module, audio Input/Output (I/O) ports, video I/O ports, earphone ports, and/or the like, for example.

An identification module may be configured as a chip for storing various information required to authenticate an authority to use the mobile terminal 100, which may include a User Identity Module (UIM), a Subscriber Identity Module (SIM), and/or the like. The device having the identification module ('hereafter referred to as an identification device) may be implemented as a type of smart card. The identification device may be coupled to the mobile terminal 100 via a port.

The interface unit 170 may serve as a path for power to be supplied from an external cradle to the mobile terminal 100 when the mobile terminal 100 is connected to the external cradle or as a path for transferring various command signals inputted from the cradle by a user to the mobile terminal 100. The command signals or power inputted from the cradle may operate as signals for recognizing that the mobile terminal 100 has accurately been mounted to the cradle.

The controller 180 may control overall operations of the mobile terminal 100. For example, the controller 180 may perform the control and processing associated with telephony calls, data communications, video calls and/or the like. The controller 180 may include a multimedia module 181 that provides multimedia playback. The multimedia module 181 may be configured as part of the controller 180 or as a separate component.

The controller 180 can perform a pattern recognition processing so as to recognize writing or drawing input on the touch screen as text or image.

The power supply 190 may provide power required by various components under control of the controller 180. The provided power may be internal power, external power, and/or a combination thereof.

Embodiments may be implemented in a computer-readable medium using, for example, software, hardware and/or some combination thereof.

For a hardware implementation, embodiments may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, and/or a selective combination thereof. Such embodiments may be implemented by the controller 180.

For software implementation, embodiments such as procedures and functions may be implemented together with separate software modules each of which performs at least one of functions and operations. The software codes may be implemented with a software application written in any suitable programming language. The software codes may be stored in the memory 160 and executed by the controller 180.

As discussed above, the shielding member may be configured as a part of the case so as to implement a structure of blocking electromagnetic waves. This may result in a slimming of a thickness of a mobile terminal.

Embodiments may simplify an assembly process of the mobile terminal as compared to a shield that can being mounted on a printed circuit board, and may also reduce a weight of the mobile terminal.

Embodiments of the present invention may be implemented such that the shielding member formed of a metal can configure at least one surface of the case, thereby improving rigidity of the case.

Embodiments of the present invention may provide a mobile terminal with a shielding member for blocking electromagnetic waves. This may decrease a thickness of the mobile terminal and enhance a rigidity of a case of the mobile terminal.

A mobile terminal may be provided that includes front and rear cases, an intermediate case disposed between the front and rear cases, and a printed circuit board disposed between at least one of the front and rear cases and the intermediate case. The intermediate case may include a shielding member formed of a metal and configured to define shielding regions of the printed circuit board, and an exterior member configured to enclose a periphery of the shielding member, formed of a non-conductive material, and integrally formed with the shielding member.

The exterior member may be made of a synthetic resin and may be formed together with the shielding member by an insertion injection molding.

The shielding member may include a base configured in a plate shape and integrally formed with the case, and an extending portion extending from the base to contact the printed circuit board. The extending portion may be formed along peripheries of the shielding regions.

The base may include a first surface facing the printed circuit board and a second surface facing an opposite direction than the first surface. The extending portion may extend from the first surface.

A metallic pattern may be formed on a surface facing the first surface of the printed circuit board and may be configured along peripheries of the shielding regions to contact the extending portion.

The exterior member may be formed to cover at least one region of each of the first surface and the second surface.

A mobile terminal may be provided that includes a case formed of a non-conductive material and configured as at least a part of an outside of a terminal body, a printed circuit board installed inside the case, and a shielding member configured to electrically shield electric devices disposed on the printed circuit board. The shielding member may include a base formed of a metal and integrally formed with the case with at least one region thereof being inserted into the case, and an extending portion formed of a conductive material, and extending from the base to contact the printed circuit board. The extending portion may define shielding regions between the base and the printed circuit board.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
a front case;
a rear case;
an intermediate case disposed between the front case and the rear case; and
a circuit board disposed to face the intermediate case,
wherein the intermediate case comprises:
a shielding member formed of a metal, the shielding member having a base formed in a plate shape and a plurality of ribs that extend from the base to the circuit board to define a plurality of shielding regions with the circuit board and the base, and
a non-conductive member configured to enclose a periphery of the shielding member, the non-conductive member directly coupled to edges of the base to be integrally formed with the shielding member,
wherein the plurality of ribs comprise:
a welded portion configured to be welded onto the base; and
a contact portion extending from the welded portion and having a contact surface that contacts the circuit board,
wherein the non-conductive member is made of a synthetic resin and is integrally formed together with the shielding member by an insertion injection molding.

2. The mobile terminal of clam 1, wherein the plurality of ribs contact a ground wire of the circuit board.

3. The mobile terminal of claim 1, wherein the non-conductive member forms an exterior of the mobile terminal.

4. The mobile terminal of claim 1, wherein the base includes a first surface to face the circuit board and a second surface to face an opposite direction than the first surface, and the plurality of ribs to extend from the first surface toward the circuit board.

5. The mobile terminal of claim 1, wherein the circuit board includes the plurality of shielding regions, and
a metallic pattern is formed along peripheries of the shielding regions on a surface of the circuit board facing the first surface, and the metallic pattern to contact the plurality of ribs.

6. The mobile terminal of claim 5, wherein the metallic pattern to partition the plurality of shielding regions configured on the circuit board.

7. The mobile terminal of claim 1, further comprising a display on a surface of the base to output visual information via a window formed on the front case or the rear case.

8. The mobile terminal of claim 1, wherein the shielding member has a first width, length and thickness.

9. The mobile terminal of claim 8, wherein the non-conductive member has a second thickness attached to at least two edges of the shielding member.

10. The mobile terminal of claim 9, wherein the second thickness of the non-conductive member is greater than the first thickness of the shielding member.

11. The mobile terminal of claim 1, wherein the ribs are extended from the base so as to be electronically connected to the circuit board.

12. The mobile terminal of claim 1, wherein the ribs are configured to cover at least a face of an electric device mounted on the circuit board.

13. A mobile terminal comprising:
a first case;
a second case;
an intermediate case between the first case and the second case, the intermediate case having a metal shielding member and a non-conductive member integrally formed with the shielding member, the non-conductive member to surround a periphery of the shielding member, the shielding member including a plate-shaped base and a plurality of ribs that extend from the base, the base having a first surface and a second surface; and
a circuit board between the first case and the base of the intermediate case, the first surface of the base to face the circuit board and the second surface of the base to face the second case,
wherein the non-conductive member is directly coupled to edges of the plate-shaped base to be integrally formed with the shielding member,
wherein the plurality of ribs of the shielding member extend from the plate-shaped base toward the circuit board between the first case and the base to define a plurality of shielding regions with the circuit board and the base,
wherein the plurality of ribs comprise:
a welded portion configured to be welded onto the base; and
a contact portion extending from the welded portion and having a contact surface that contacts the circuit board,
wherein the non-conductive member is made of a synthetic resin and is integrally formed together with the shielding member by an insertion injection molding.

14. The mobile terminal of claim 13, wherein the shielding member has a first width, length and thickness.

15. The mobile terminal of claim 14, wherein the non-conductive member has a second thickness attached to at least two edges of the shielding member.

16. The mobile terminal of claim 15, wherein the second thickness of the non-conductive member is greater than the first thickness of the shielding member.

17. The mobile terminal of claim 13, wherein the ribs extend from the first surface of the base so as to be electronically connected to the circuit board.

18. The mobile terminal of claim 13, wherein the ribs to cover at least a face of an electric device mounted on the circuit board.

* * * * *